(12) United States Patent
Shen et al.

(10) Patent No.: US 9,326,631 B2  
(45) Date of Patent: May 3, 2016

(54) KITCHEN UTENSIL WITH COMPOUND HINGE

(71) Applicant: Focus Products Group International, LLC, Lincolnshire, IL (US)

(72) Inventors: Zhe Shen, Lincolnshire, IL (US); Christopher M. Dorion, Elmhurst, IL (US); William A. Bucklew, Wilmette, IL (US)

(73) Assignee: FOCUS PRODUCTS GROUP INTERNATIONAL, LLP, Lincolnshire, IL (US)

(*) Notice: Subject to any disclaimer, the term of this patent is extended or adjusted under 35 U.S.C. 154(b) by 37 days.

(21) Appl. No.: 14/209,457

(22) Filed: Mar. 13, 2014

(65) Prior Publication Data

US 2015/0257571 A1   Sep. 17, 2015

(51) Int. Cl.  
*A47J 19/02* (2006.01)  
*B30B 9/06* (2006.01)  
*A47J 19/06* (2006.01)

(52) U.S. Cl.  
CPC ............... *A47J 19/022* (2013.01); *A47J 19/06* (2013.01); *B30B 9/06* (2013.01)

(58) Field of Classification Search  
CPC ......... A47J 19/00; A47J 19/06; A47J 19/022; B30B 9/02; B30B 9/04; B30B 9/06  
USPC ........... 100/110, 116, 234, 243; 99/495, 506, 99/508, 510; 241/169; D7/666  
See application file for complete search history.

(56) References Cited

U.S. PATENT DOCUMENTS

| | | | | |
|---|---|---|---|---|
| 216,699 | A * | 6/1879 | Reynolds | 100/213 |
| 769,785 | A | 9/1904 | Bruen | |
| 4,531,457 | A | 7/1985 | Sivaslian | |
| 5,463,941 | A * | 11/1995 | Gibson | 99/495 |
| 6,543,344 | B1 | 4/2003 | Settele | |
| 7,117,785 | B2 * | 10/2006 | Walker, III | 100/126 |
| 7,395,753 | B2 | 7/2008 | Dorion | |
| 8,534,190 | B2 | 9/2013 | Ericsson et al. | |
| 2004/0134362 | A1 | 7/2004 | Harrison-Griffin et al. | |
| 2010/0229736 | A1 | 9/2010 | Griffith | |
| 2012/0037015 | A1 * | 2/2012 | Shih | 101/22 |

FOREIGN PATENT DOCUMENTS

CN      202932697 U      5/2013

* cited by examiner

*Primary Examiner* — Jimmy T Nguyen  
(74) *Attorney, Agent, or Firm* — Thompson Coburn LLP

(57) ABSTRACT

A food press has a first handle with first and second ends. The food press has a second handle with first and second ends. The first and second handles are hingedly connected to one another at their first ends. The food press has an intermediate member hingedly connected to the first end of the second handle and slidingly connected to the first end of the first handle. The intermediate member substantially fills the space between the first and second handles when the first and second handles are brought together. The press may be configured as a seafood cracker, nutcracker, garlic press, and/or food slicer.

19 Claims, 13 Drawing Sheets

KITCHEN UTENSIL WITH COMPOUND HINGE

BACKGROUND AND SUMMARY

This disclosure relates to food product presses, such as presses for lemons, limes, garlic, and other foods. The presses are manually operated, and can include one or more handles enabling a user to exert pressure upon a food product. Among other things, such pressure can be exerted to extract fluid from the food product (e.g., press juice from lemons, limes, or other fruits), to extract any other part of the food product (e.g., remove pits or seeds from a food item), and/or to crush, crack, cut shape, or change the food product in any number of different manners.

DETAILED DESCRIPTION

Figure 1:
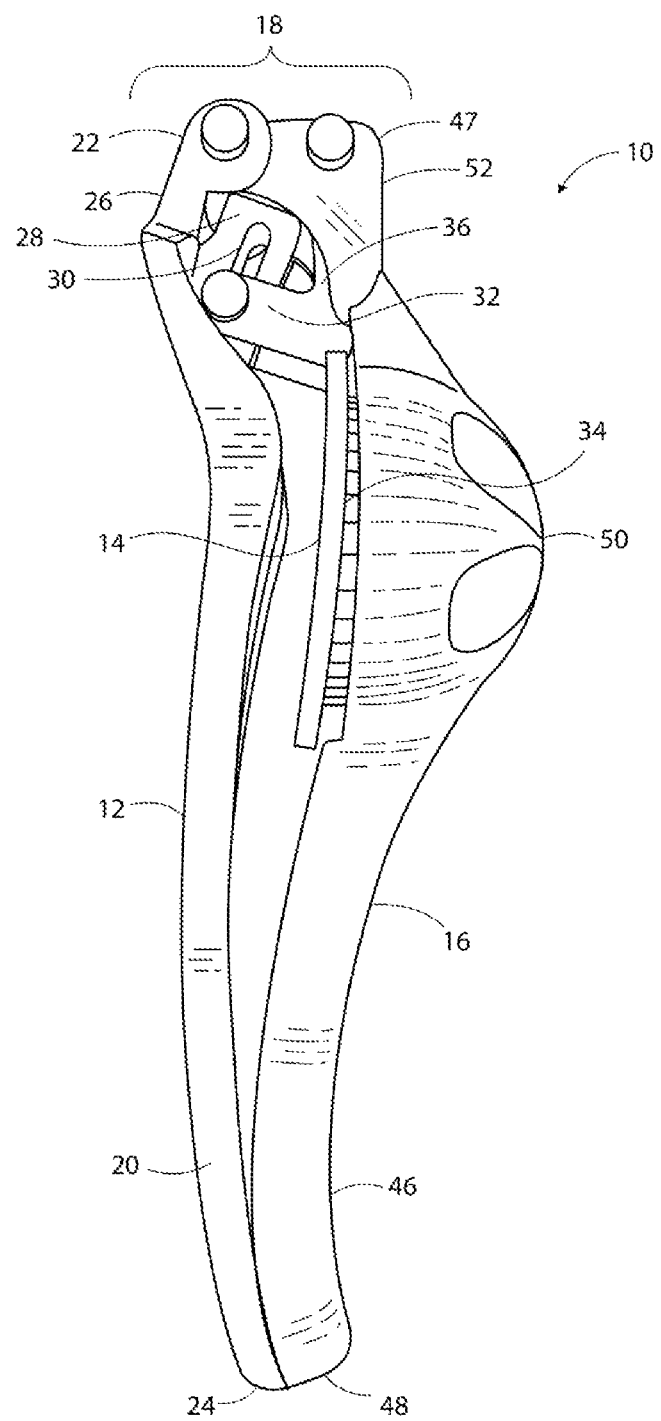
FIG. 1 illustrates a side elevational view of a press in the form of a juicer.

Before any embodiments of the invention are explained in detail, it is to be understood that the description herein is not limited in its application to the details of construction and the arrangement of components set forth in the following description or illustrated in the drawings. The described embodiments may be carried out in various ways. Also, it is to be understood that the phraseology and terminology used herein is for the purpose of description and should not be regarded as limiting.

The press 10 comprises a first handle part 12, a press part 14, and a second handle part 16. Each portion cooperates to press the food product placed therebetween. Each of the parts 12, 14, 16 can be made of a single integral piece of material manufactured in any suitable manner, such as by molding, casting, stamping, pressing, machining, and/or other manufacturing operations. In other embodiments, any one or more of these parts 12, 14, 16 can be constructed of multiple elements connected together in any suitable manner, such as by welding or brazing, adhesive or cohesive bonding material, screws, bolts, nails, rivets, pins, clasps, clamps, and other fasteners, threaded, snap fits, or other inter-engaging connections, and the like. The parts 12, 14, 16 of the press 10 are connected by a compound hinge 18. The compound hinge 18 enables movement of each of the parts 12, 14, 16 relative to one another.

Figure 2:
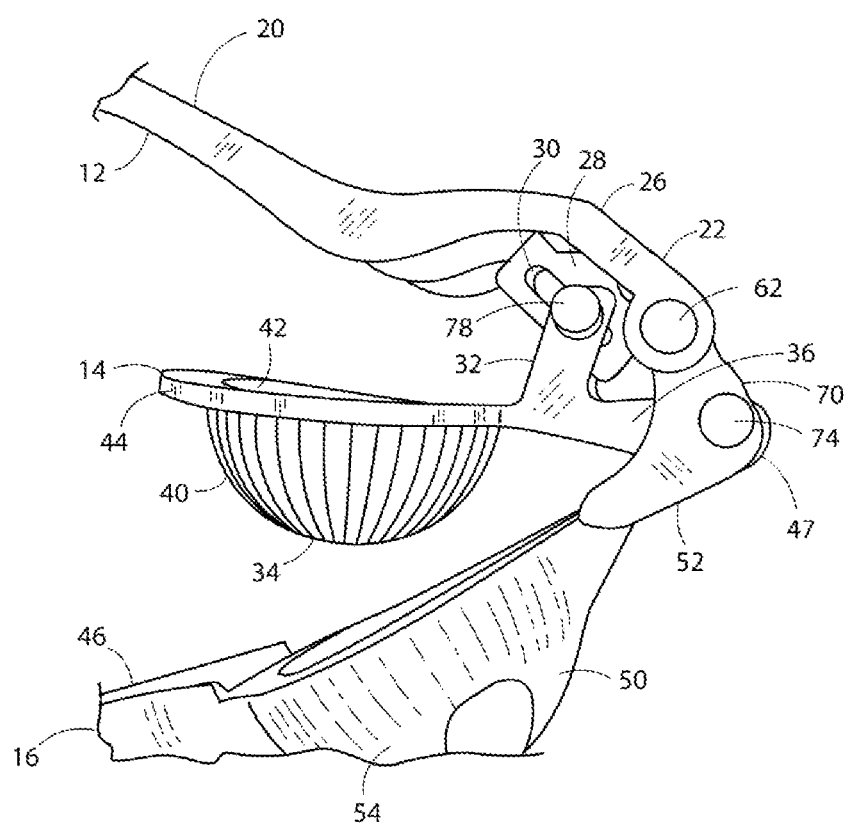
FIG. 2 illustrates an enlarged partial view of a compound hinge of the juicer of FIG. 1.
Figure 3:
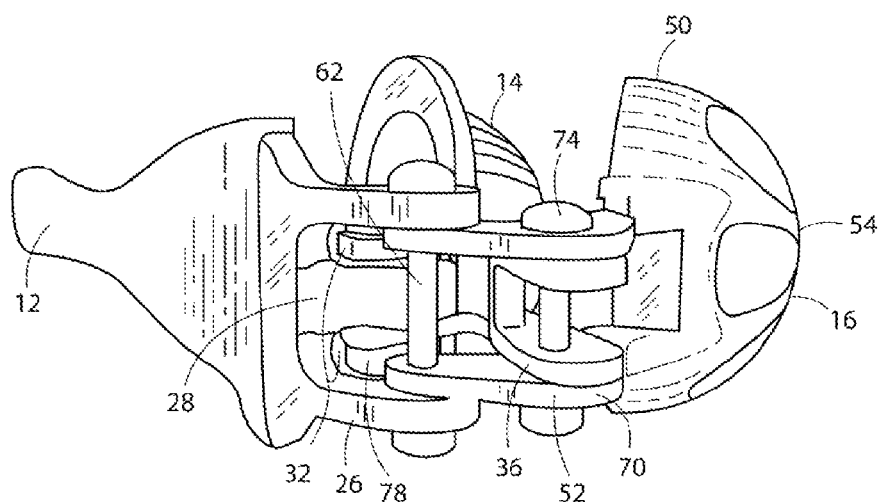
FIG. 3 illustrates a front elevational view of the compound hinge of FIG. 2.
Figure 4:
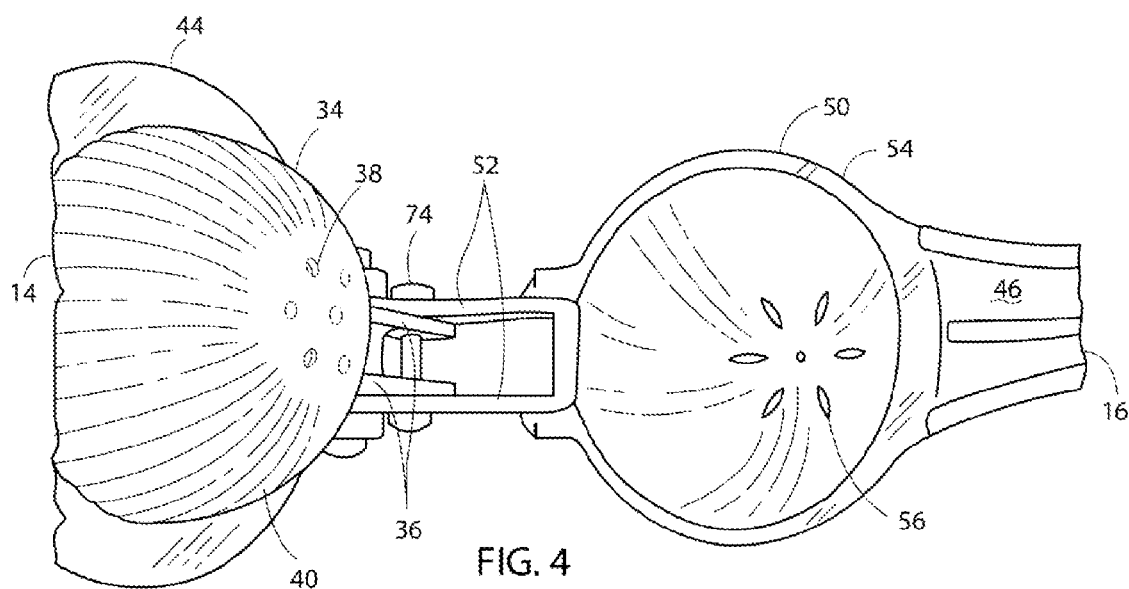
FIG. 4 illustrates a partial, perspective view of a press piece of a press portion and a receiving member of a handle part of the press of FIG. 1.
Figure 5:
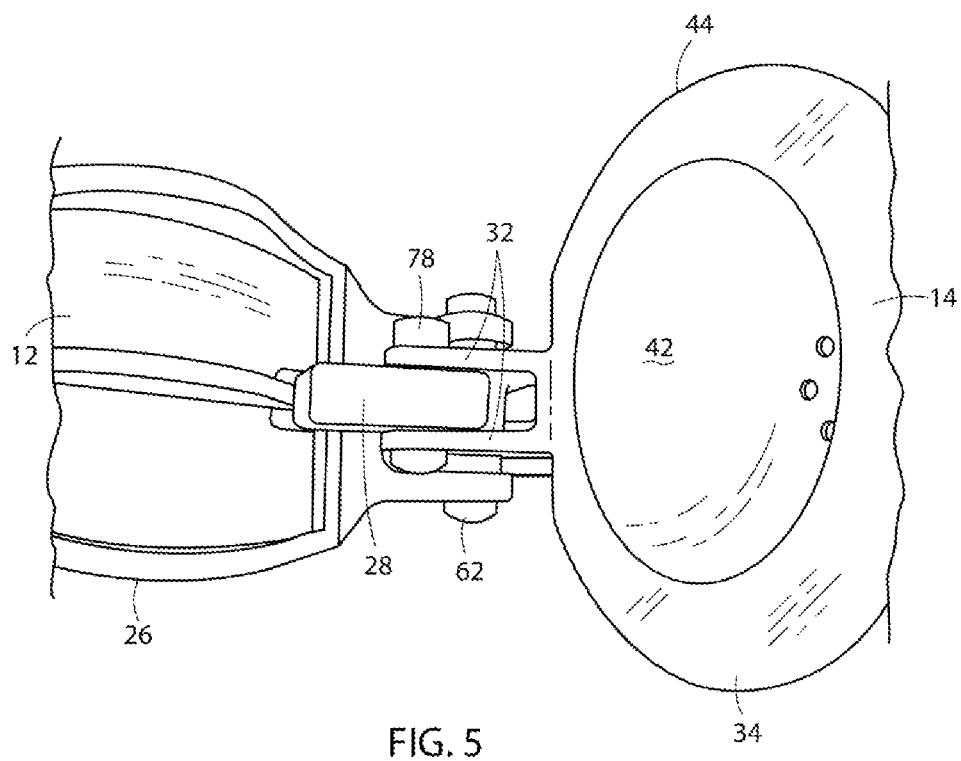
FIG. 5 illustrates a partial, perspective view of the press piece of a press portion and another handle part of the press of FIG. 1.

The first handle part 12 comprises a handle 20 with opposite first and second ends 22, 24 and a hinge portion 26 at the first end 22. The hinge portion 26 allows the first handle part 12 to be pivotally connected with the second handle part 16. The first handle part also includes a web member 28 with a slot 30 just inboard of the first end 22. The web member 28 may extend in a gap formed by bifurcations of the hinge portion 26 at the first end 22. The web member 28 may extend from the handle 20 in the area adjacent to the proximal end 22 and the hinge portion 26. The slot 30 of the web member 28 allows the press part 14 to be slidingly connected to the first handle part 12. As will be explained in greater detail below, the pivoting and translating connection between the first handle part 12 and the press part 14, and the pivoting connection between the first and second handle parts 12, 16, enables the press part to be moved in tandem with the first handle part when the first handle part is pivoted relative to the second handle part; and vice versa, the press part may be moved in tandem with the second handle part when the second handle part is pivoted relative to the first handle part. The first handle part 12 may be any shape, and the handle 20 and hinge portions 26 may be shaped as desired to allow the first handle part to pivotally connect the second handle part 16 and to accommodate the web member 28 on the underside of the handle of the first handle part. For instance, as shown in FIGS. 1 and 2, the handle 20 has a slight bending shape at the hinge portion 26 adjacent to the first end 22. The hinge portion 26 may be birfucated to allow a pivot connection with the second handle part 16.

Figure 9:
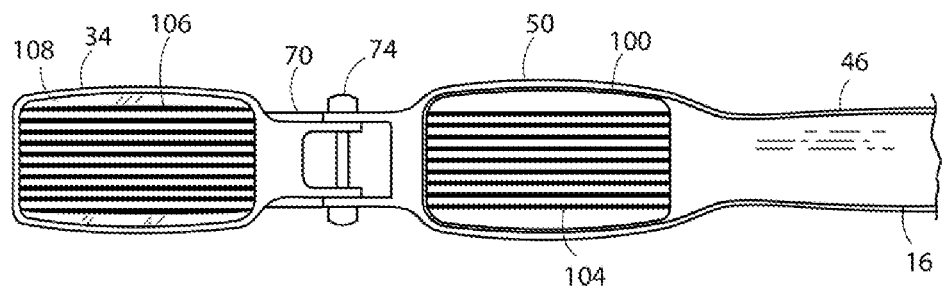
FIG. 9 illustrates a partial, perspective view of an embodiment of the press piece and the receiving member of the garlic slicer of FIG. 8, one of the handle parts not shown for ease of illustration.

The press part 14 of the food product press 10 comprises an arm 32, press piece 34, and a hinge portion 36. The press piece 34 may be disposed on a distal end of the hinge portion 36 and the arm 32. The hinge portion 36 and the arm 32 may form a general "Y" shape extending from the press piece 34. The hinge portion 36 allows the press part 14 to be pivotally connected with the second handle part 16. The arm 32 allows the press part 14 to be slidingly connected with the first handle part 12. The press piece 34 may have a shape in accordance with the function of the press. For instance, as shown in FIGS. 1-5, the press piece may be generally semi-spherical, or hemispherical, in shape, for instance, when the press is to be used as a juicer. The press piece may be cone shaped, frusto-conical, pyramid-shaped, or rod-shaped, or may be rotund (including oval, elliptical, egg-shaped, and other rotund shapes), may have an irregular shape, or can have any other shape desired. For instance, in the embodiment of a garlic press, the press piece may have rectangular shaped pushing members (FIG. 9) for pushing food through blades, or cylindrical shaped protuberances (FIG. 11) for pushing food through holes. For instance, in the embodiment of a food slicer, the press piece may have rectangular shaped pushing members (FIG. 13) for pushing food through blades. The press piece 34 may have a number of apertures 38 extending therethrough. The apertures 38 can be located anywhere in the press piece 34, and in some embodiments, may be located at the bottom of the press piece press piece 34. The press piece 34 may also have any number of apertures 38 having any pattern or they may be in a pattern-less arrangement. The apertures 38 may have any shape and side desired. For example, in the embodiment of the juicer of FIG. 5, the apertures may be round and generally centrally-located. The press piece 34 may have a single aperture 38 having a larger or smaller size, can have several rings and/or lines of apertures in the side walls of the press piece. The apertures may be elongated apertures (e. g., slots), and have a rectangular, elongated, diamond, star, or other shapes, and the like. The apertures may be arranged in rows or lines. The press piece may have a profiled outer surface 40 in order to better facilitate movement of fluid or other food product matter across the outer surface. The profiled outer surface 40 may be generally semi-spherical, or hemispherical, in shape. The profile 40 may include a number of ribs extending from a generally central location. The profile may include a number of ribs that extend in any other direction or combination of directions as desired. The profiled outer surface 40 of the press piece may be defined at least in part by bumps, ribs, or other types of protuberances, dimples, grooves, or other types of apertures, and any combination thereof located on any portion or all of the press piece. The press piece 34 may have a substantially smooth inner surface 42, or the inner surface may be profiled with ribs or any of the other features described above. In some embodiments, the press part 14 may have a peripherally-extending lip 44. The lip 44 can extend in all directions, or in less than all directions, as desired.

The second handle part 16 of the food product press 10 comprises a handle 46 with first and second ends 47,48. The second handle part 16 has a receiving member 50 intermediate of the first and second ends 47,48, and a hinge portion 52 at the first end. The second handle part 16 may be any shape, and the handle 46 and hinge portion 52 may be shaped as desired to allow to pivotally connect the first handle part 12 and to accommodate the receiving member 50 of the handle 46. For instance, as shown in FIGS. 1 and 2, the handle 46 has a slight bending shape toward the second end 48. The hinge portion 52 may be bifurcated to allow a pivot connection with the first handle part 12.

In the embodiment of a juicer of FIGS. 1-5, the receiving member 50 may have a cavity and may be generally semi-spherical, or hemispherical, in shape, although other shapes may be instead be used. By way of example only, the receiving member 50 can instead have any of the shapes described above with reference to the press piece 34 of the press part 14. In some embodiments, the receiving member 50 may have a shape generally corresponding to the shape of the press piece 34 of the press part 14. When the receiving member and the press piece have the same general shape, the receiving member may be dimensionally larger than the press piece, thereby allowing the press piece to fit or partially fit within the receiving member. In other embodiments, the receiving member 50 has a shape different from that of the press piece 34 of the press part 14. In the embodiment of the juicer, the surface contour of the receiving member 50 in the second handle part 16 is substantially the same shape as, although slightly larger than, the surface contour of the press piece 34 in the press part 14. The receiving member 50 and the press piece 34 may be substantially the same shape even if they have a profiled or an otherwise non-smooth surface, e.g. ribs, superimposed thereon. The receiving member 50 may be shaped and dimensioned to receive the press piece 34 of the press part 14. The receiving member 50 may also be shaped and dimensioned to partially receive the press piece 34 of the press part 14, such as the bottom half of the press piece 34. Accordingly, the press piece 34 can be nested within the receiving member 50 of the second handle part 16, and may be smaller than the receiving member 50. The receiving member 50 may have a number of apertures 56 extending therethrough. The apertures 56 can be located anywhere in the receiving member 50, and may be are located at the bottom of the receiving member. The receiving member 50 can have any number of apertures 56 having any pattern or may be in a pattern-less arrangement and having any shape and size desired. The receiving member 50 can have a single aperture 56 having a larger or smaller size, and/or can have several rings and/or lines of apertures in the sidewalls of the receiving member 50. The apertures may be elongated apertures (e.g., slots), apertures having rectangular, elongated, diamond, star, or other shapes, and the like. The apertures may comprise spaces between blades or wires.

The receiving member 50 may have a substantially smooth surface or may be profiled in order to better facilitate movement of fluid or other food product matter across such surfaces. The food product can be pressed by the press piece 34 of the press part 14 against the receiving member of the second handle part 16. A profiled surface of the receiving member 50 (whether used in conjunction with a profiled outer surface 38 of the press piece 34 or not) can permit movement of fluid or other food product matter across the surface 58 of the recess 50. To this end, the receiving member 50 of the second handle part 16 can have any number of ribs or other surface features defining a profiled surface, including any of the surface features described above with reference to the profiled surface 28 of the press piece 34.

As described above, the food product press 10 compound hinge 18 allows movement of the first and second handle parts 12,16 and press part 14. The compound hinge 18 comprises the hinge portions 26,36,52 of the first and second handle parts 12,16, and the press part 14, respectively. The hinge portions 26,36,52 can have any shape and can be connected together in any manner enabling pivoting motion between the first and second handle parts 12,16, and the press part 14.

The compound hinge 18 may include a pivot connection of the first and second handle parts 12,16 at their respective hinge portions 26,52 at a common pivot point 62. The first handle part 12 may have its hinge portion 32 bifurcated and the second handle part 16 may have its hinge portion 52 bifurcated with the bifurcations of the second handle part hinge portion 52 arranged between the bifurcations of the first handle part hinge portion 26. The pivot may also be one of several pivots that can be utilized to pivotably connect the first and second handle parts 12,16. For example, the first and second handle parts 12,16 may be connected by one or more ball joints. As another example, the hinge portions 26,52 may be shaped to eliminate the need for a separate hinge pin 62, such as by utilizing mating boss shapes for each of the hinge portions 26,52. Also, the hinge portions 26,52 need not necessarily include one or more bifurcations as described above, and can instead be defined by any other part of the hinge portions 26,52 coupled together about a pivot axis. For example, a hinge pin 62 may be received within apertures located elsewhere in the hinge portions 26,52 (i.e., not necessarily located in bosses or bifurcations extending away from the main body of each portion). The features between the first and second handle parts may also be reversed or a combination residing on both of the first and second handle parts.

The compound hinge 18 may also include a pivot connection of the hinge portion 36 of the press part 14 to the hinge portion 52 of the second handle part 16. The hinge portion 52 of the second handle part 16 may include a bifurcated knuckle 70. The hinge portion 36 of the press portion 14 may also be bifurcated. The knuckle 70 and each bifurcation of the press portion hinge portion 36 may have holes dimensioned to receive a hinge pin 74 to pivotably connect the knuckle to the bifurcations, and therefore, the press part 14 to the second handle part 16. The press part 14 bifurcated hinge portion 36 may be received between the bifurcations of the knuckle 70 of the second handle part 16. The pivot may also be one of several pivots that can be utilized to pivotably connect the press part 14 and the second handle part 16. For example, the press part and the second handle part may be connected by one or more ball joints. As another example, the hinge portions 36,52 may be shaped to eliminate the need for a separate hinge pin 74, such as by utilizing mating shapes for each of the hinge portions 36,52. Also, the hinge portions 36,52 need not necessarily include bifurcations as described above, and can instead be defined by any other part of the respective hinge portions 26,52 coupled together about a pivot axis. For example, a hinge pin 74 may be received within apertures located elsewhere in the respective hinge portions 36,52 (i.e., not necessarily located in bosses extending away from the main body of each portion. The features may also be reversed.

The compound hinge 18 also includes a sliding connection between the first handle part 12 and the press part 14. As shown in the drawings, the distal end of the arm 32 may have a sliding connection with the first handle part 12. The sliding connection between the first handle part 12 and the press part 14 may comprise a pin 78 received in the slot 30 of the web member 28. The pin 78 may have enlarged diameter axial ends to maintain the pin within the slot. The arm 32 may be bifurcated and fit around the web member 28 with the pin 78 extending between each bifurcation of the arm. The opposite orientation may also be employed with the web member being bifurcated and the arm disposed between each bifurcation of the web member.

The compound hinge 18 may be located a greater distance or a smaller distance from the handles 22,32, such as by increasing the size of the knuckle 70, the hinge portions, 26,36,52, and/or by changing the shape of handles 20,46. The parts 12,14,16 of the food product press 10 may be permanently connected together at the hinge 18, such as by using a rivet or other permanent fastener as the hinge pins 62,74,78. A permanent connection tends to eliminate the chance of losing one or more part 12,14,16 of the food product press 10. In the alternative, one or more parts 12,14,16 can be removably connected, such as, for cleaning or replacement with another portion 12,14,16 having a different size and/or shape (e.g., for pressing other types of products).

FIGS. 6-13 show alternate configurations of the press. The alternate configurations may be achieved in the form of separate utensils or by removing and attaching different second and third portions, as described above.

Figure 6:
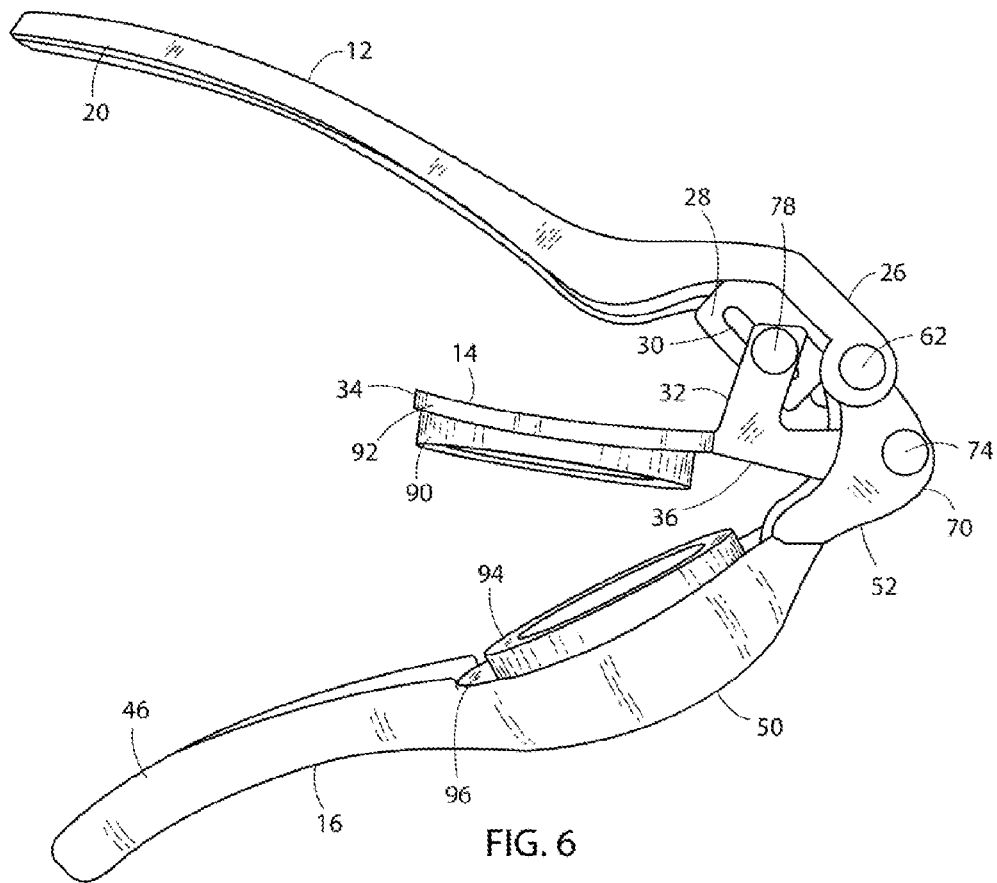
FIG. 6 illustrates a side elevational view of a press in the form of a nut cracker.
Figure 7:
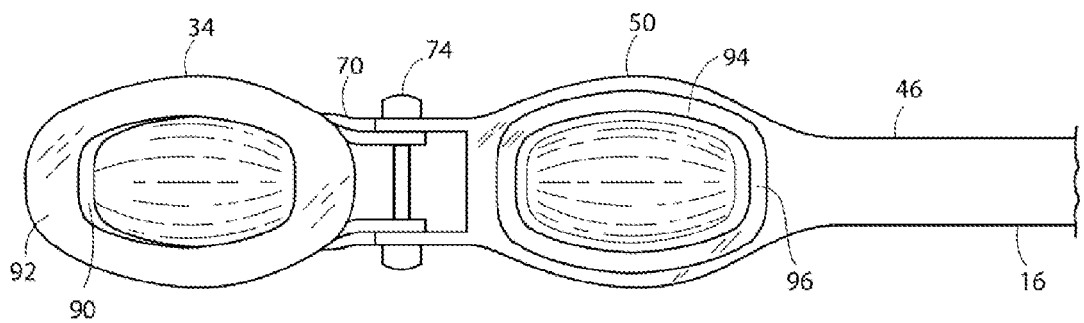
FIG. 7 illustrates a partial, perspective view of a press piece and a receiving member of the nutcracker of FIG. 7, the one of the handle parts not shown for ease of illustration.
Figure 8:
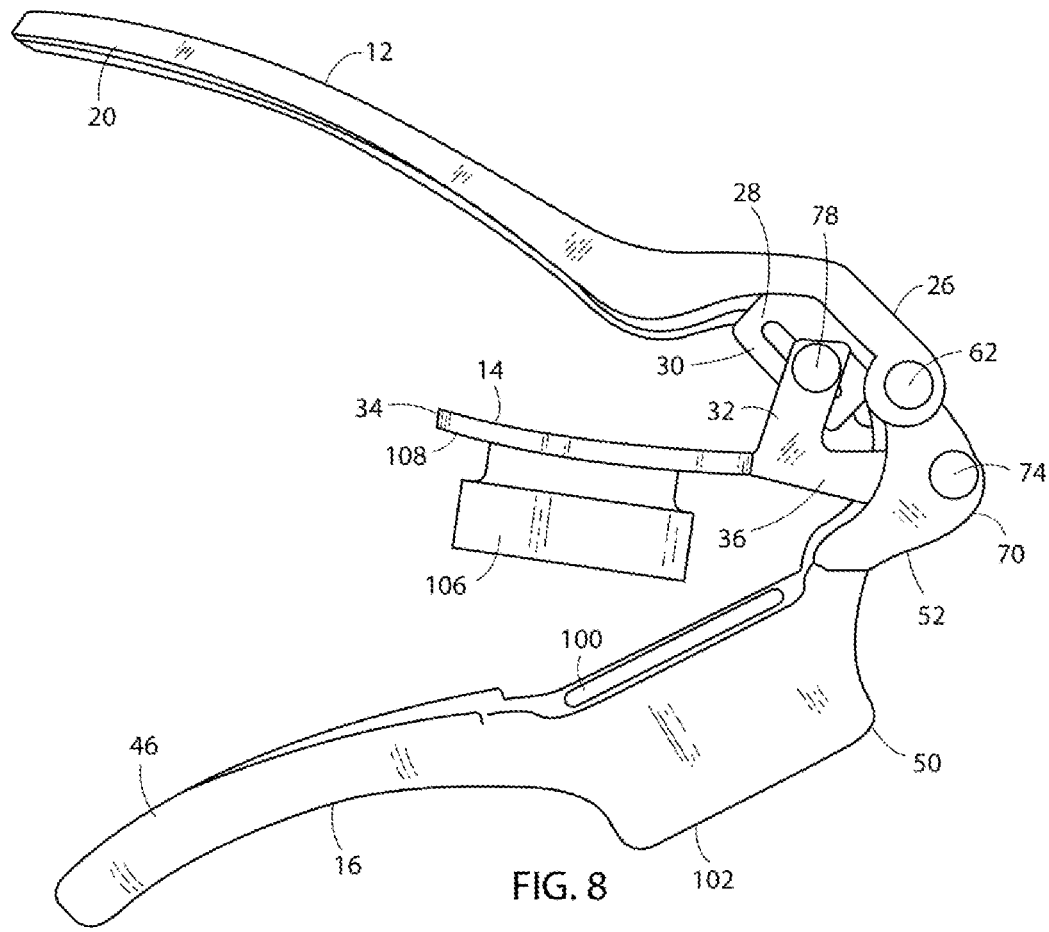
FIG. 8 illustrates a side elevational view of the press in the form of a garlic slicer.

Referring to FIGS. 6-7, the press may be configured as a nutcracker or seafood cracker. In this configuration, the press piece 34 may have a press portion 90 extending from a base plate 92. The second handle part receiving member 50 may comprise a press portion 94 extending from a base plate 96 on an underside of the handle. The second handle part press portion 94 may face the press piece press portion 90. The nut, crab legs, or other hard food item desired to be cracked, may be positioned between the respective press portions 90,94 and cracked. The respective press portions may each have a generally concave surface. The surfaces of the press portions may be serrated. The surfaces may have complementing geometric shapes adapted to engage a particular nut variety therebetween, for instance, generally round for a walnut and generally oval for an almond. The second handle part receiving member may also comprise a protrusion extending from the handle and an opening leading into a hollow cavity of the protrusion. The press portion of the press piece may extend into the hollow cavity through the opening of the protrusion. The nut may be engaged with the press piece in the hollow interior of the cavity thereby containing shells in the hollow interior of the cavity once the nut is cracked.

Figure 10:
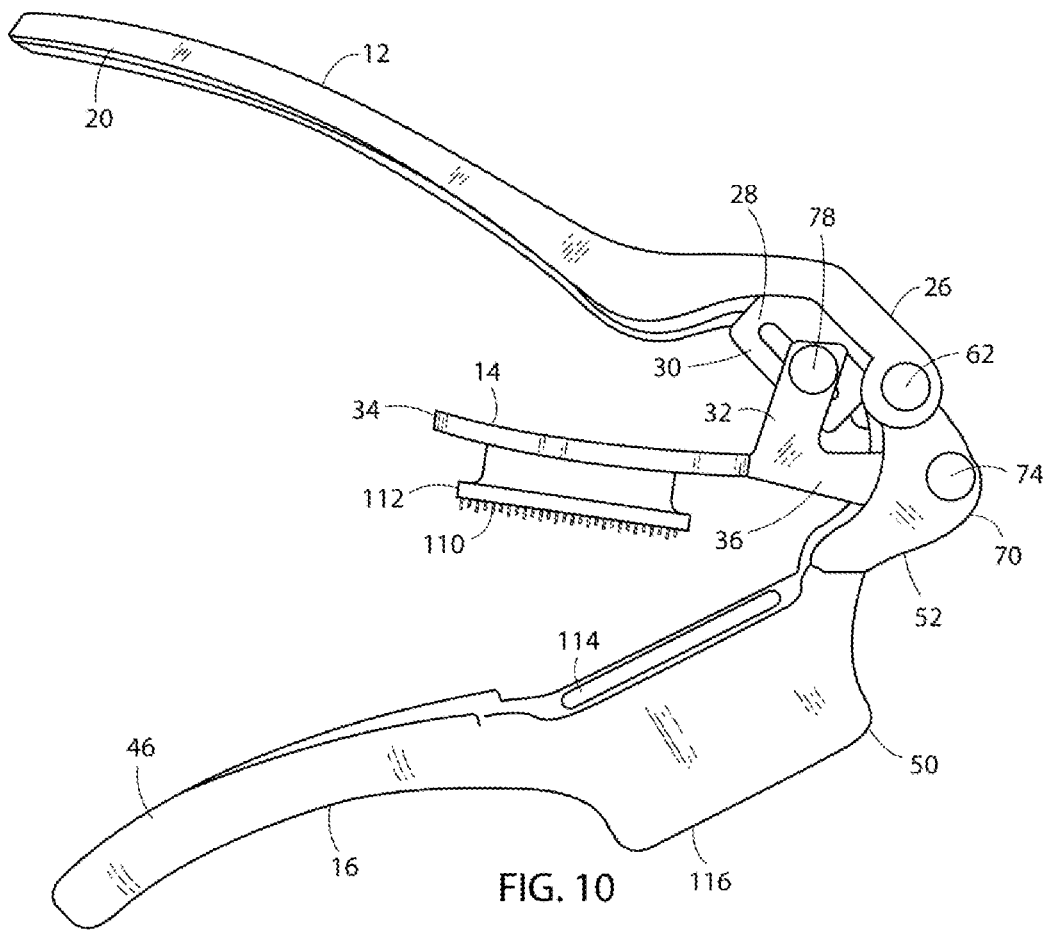
FIG. 10 illustrates a side elevational view of the press in the form of a garlic press.
Figure 11:
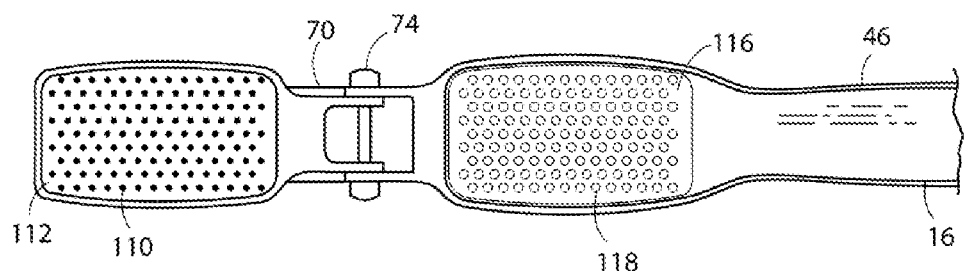
FIG. 11 illustrates a partial, perspective view of an embodiment of the press piece and the receiving member of the garlic press of FIG. 10, one of the handle parts not shown for ease of illustration.

Referring to FIG. 8-11, the press may be configured as a garlic press (i.e., a garlic slicer or garlic press). In the configuration of garlic slicer (FIGS. 8-9), the receiving member 50 may be formed as a cavity with an opening 100 facing the press piece 34 and a second opening 102 opposite the first opening. The second opening 102 may have blades 104 extending across the opening. The blades may be oriented to extend in the same direction as the handle 46 of the second handle part. The press piece 34 may be shaped with rectangular push members 106 that project from a base plate 108 and are oriented to extend in the same direction as the second handle part. The rectangular push members 106 are adapted to engage the food item and push it through the blades 104 formed in the receiving member 50. The rectangular push members 106 of the press piece may be spaced in accordance with the spacing of the blades 104 of so as to allow the rectangular push members to pass between adjacent blades when slicing the food item. FIG. 10-11 show an alternate embodiment of the press piece and receiving member in the form of a garlic press. The press piece 34 has a plurality of cylindrical shaped protuberances 110 which extend from a base plate 112. The protuberances 110 may be arranged in rows. The receiving member 50 has an opening 114 into the hollow cavity facing the protuberances 110 of the press piece 34, and a bottom plate 116 opposite the opening 114 that has a plurality of holes 118. The plurality of holes 118 is arranged in a pattern that generally corresponds to the cylindrical protuberances 110 of the press piece 34. When the press piece 34 is brought into register with the receiving member 50, the press piece protuberances 110 may extend into the receiving member bottom plate holes 118 enabling the food item to be pressed through the holes. The cavity of the receiving member may be lined with a removable insert to facilitate cleaning. The press piece protuberances may also be omitted and the base plate 112 may be configured to engage the food item and press it through the holes.

Figure 12:
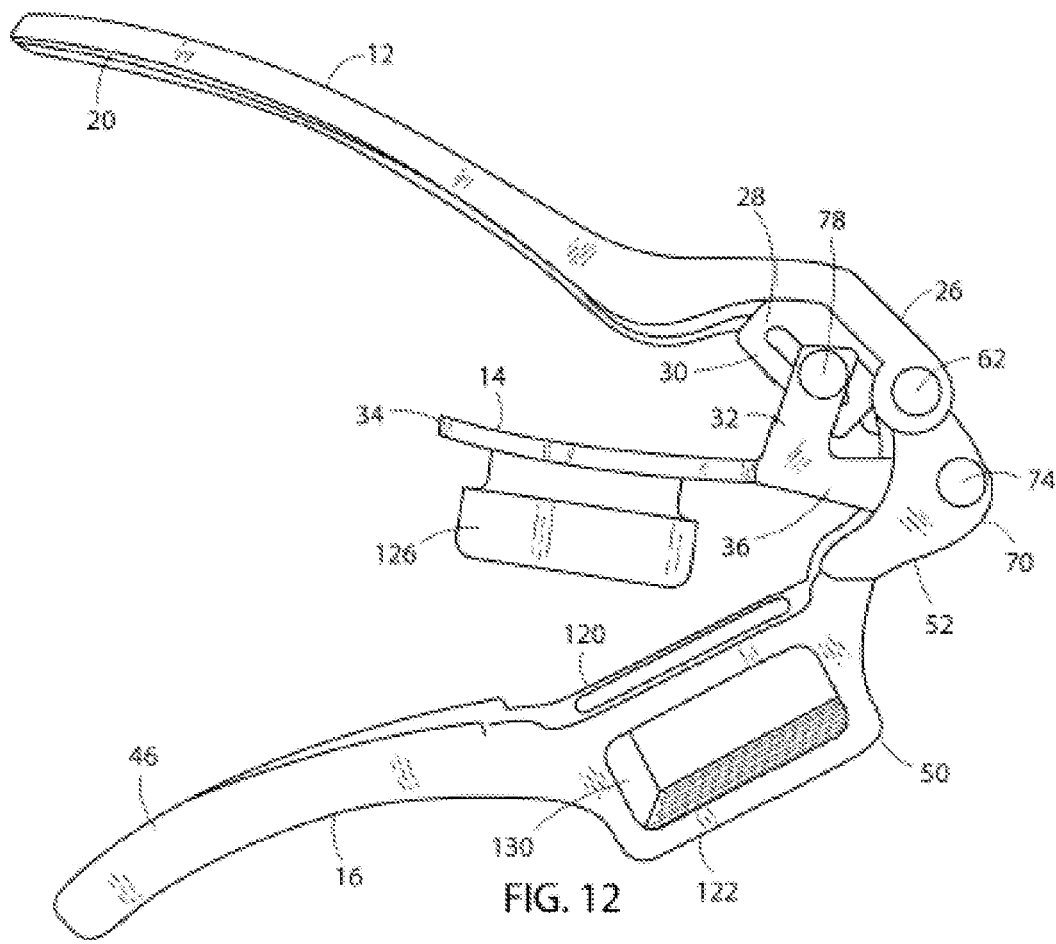
FIG. 12 illustrates a side elevational view of the press in the form of a food slicer.
Figure 13:
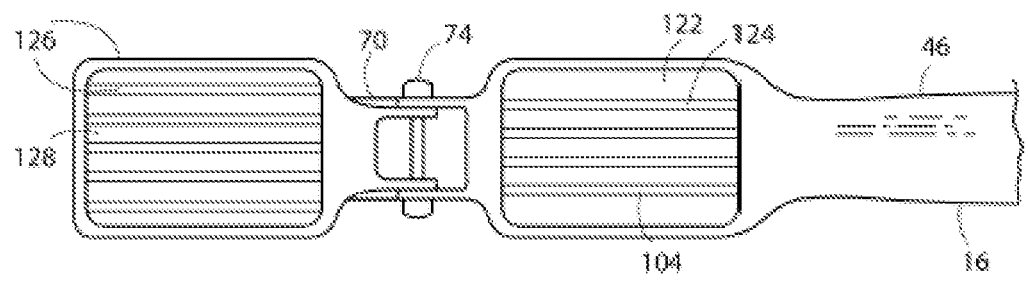
FIG. 13 illustrates a partial, perspective view of an embodiment of the press piece and the receiving member of the food slicer of FIG. 12, one of the handle parts not shown for ease of illustration.
Figure 14:
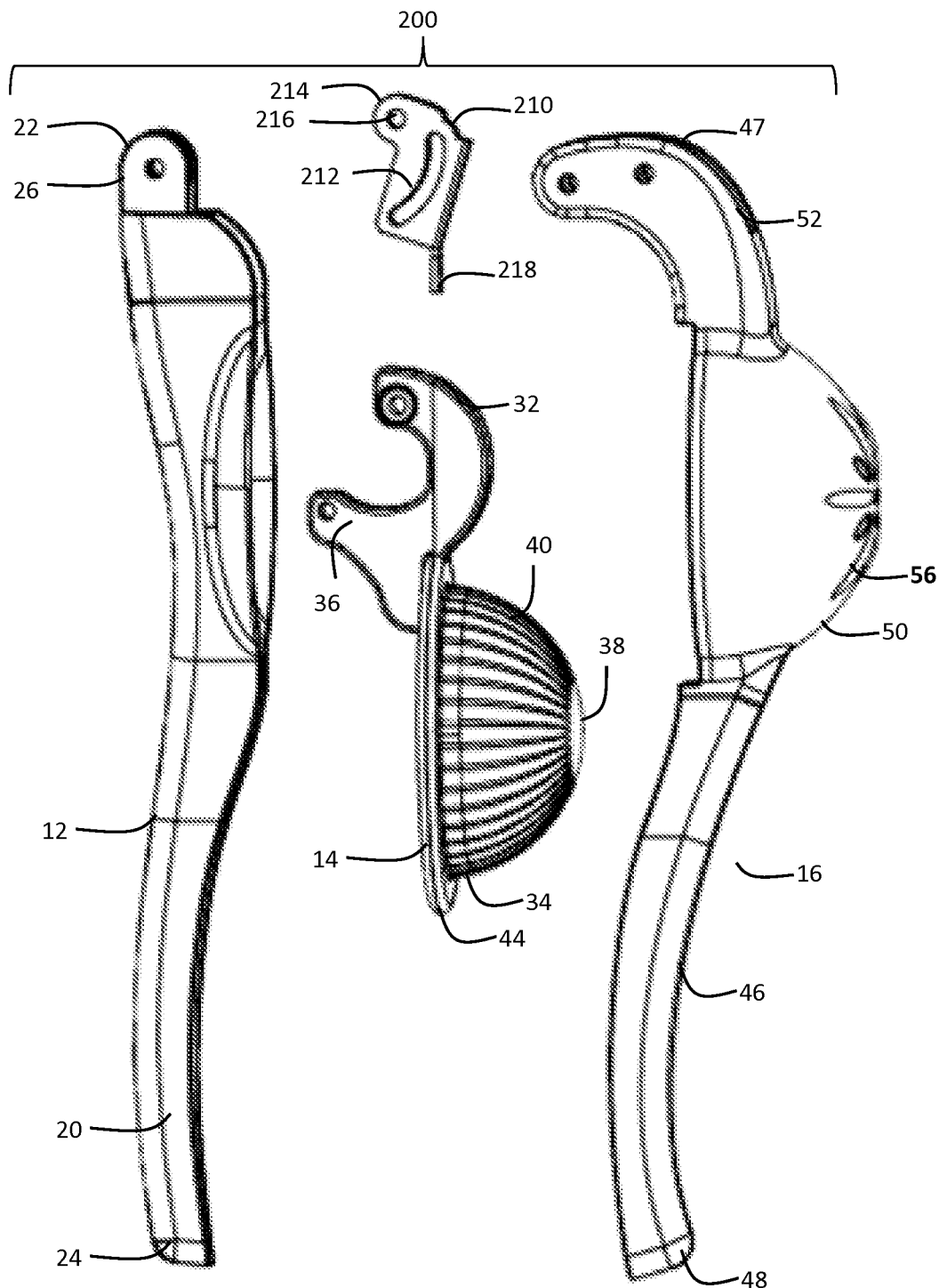
FIG. 14 illustrates an exploded view of an alternate embodiment of the press of FIG. 1.
Figure 15:
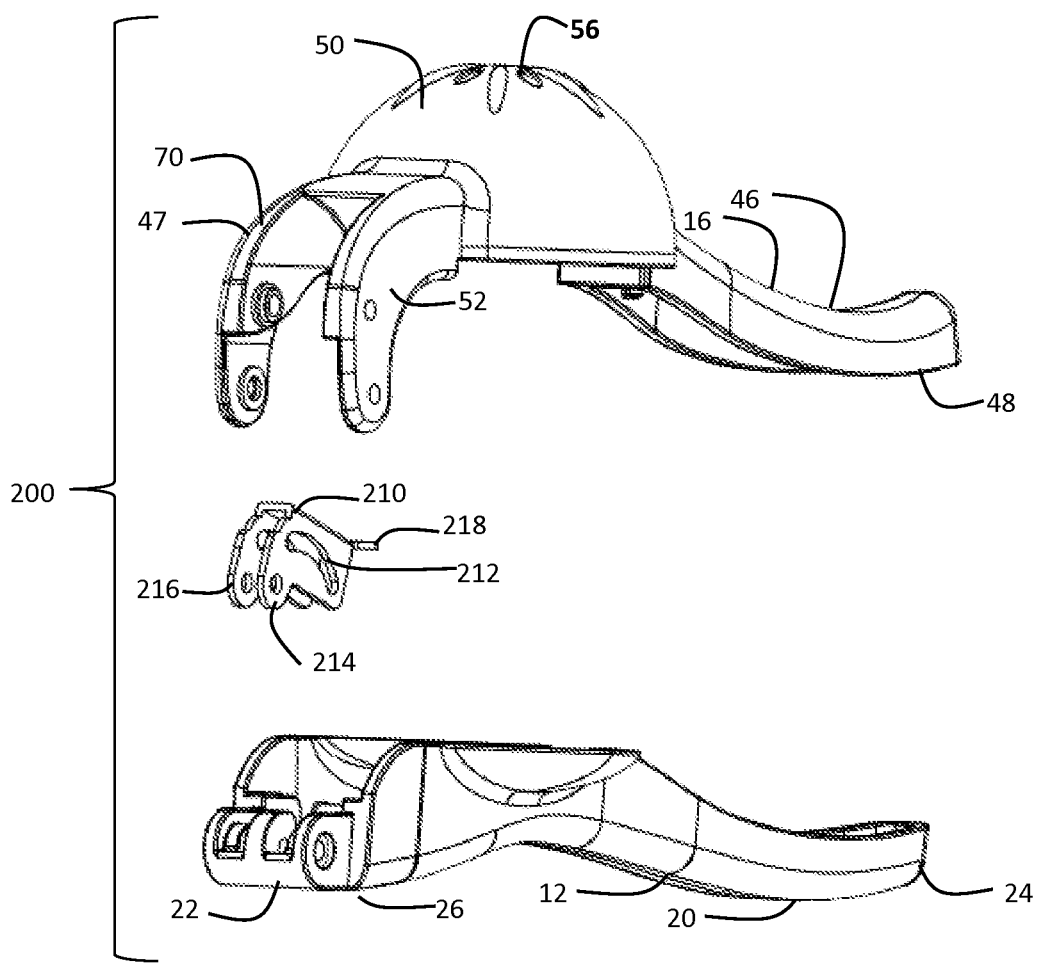
FIG. 15 illustrates an alternate exploded view of the press of FIG. 14.
Figure 16:
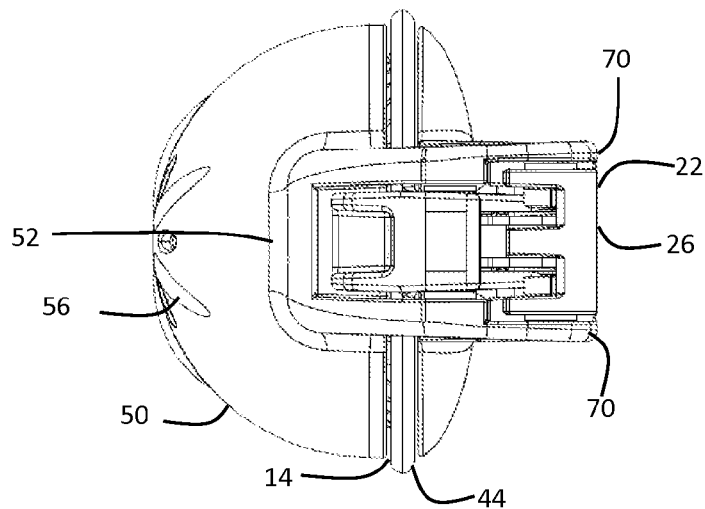
FIG. 16 is an end view of the press of FIG. 14.
Figure 17:
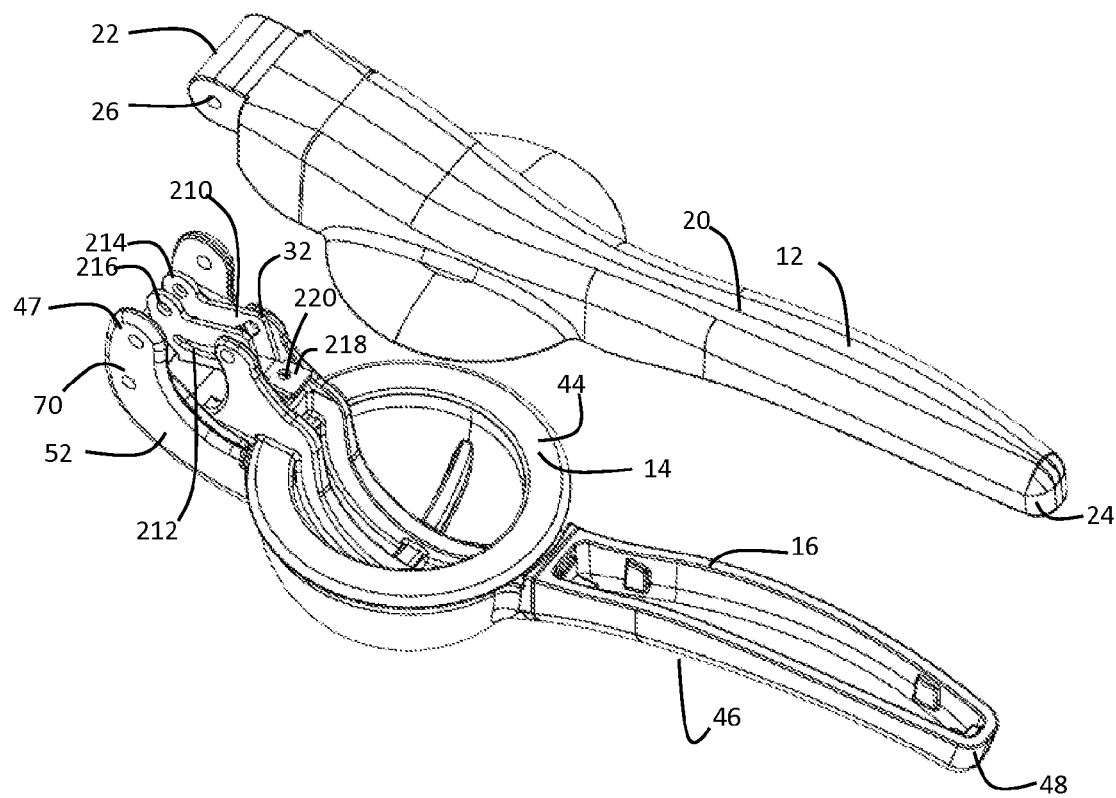
FIG. 17 is a perspective view of the press of FIG. 14 with a handle portion removed to show further detail of the compound joint.

FIGS. 12-13 show an alternate embodiment of the food press in the form of a food slicer. In this configuration, the receiving member 50 has a cavity and an opening 120 into the cavity facing the press piece 34 and a second opening opposite the first opening 122. The second opening may have blades 124 extending across the opening. The blades may be oriented to extend in the same direction as the second handle part 16. The press piece of the food slicer is similar to the press piece of the garlic slicer and comprises the plurality of a rectangular press members 126 extending from a base plate 128. The press piece 34 may be shaped with rectangular push members 126 that project from a base plate 128 and are oriented to extend in the same direction as the handle 46 of the second handle part. The rectangular push members 126 are adapted to engage the food item and push it through the blades 124 formed in the receiving member 50. The rectangular push members 126 of the press piece may be spaced in accordance with the spacing of the blades 124 of so as to allow the rectangular push members to pass between adjacent blades when slicing the food item. The receiving member has a third opening 130 into the cavity that is generally transverse to the first and second openings 120,122 of the cavity. A food item may be directed into the third opening 130 and into the cavity. As the food item is inserted into the third opening 130 of the receiving member, the first and second handle parts 12,16 are moved toward each other and the press piece 34 is directed into the cavity and the rectangular press members 126 of the press piece engage the food item, pressing it against the blades 126 in the cavity and causing the food item to be sliced and expelled through the spaces between the blades across the second opening 122.

The parts 12,14,16 of the food product press 10 can be color-coded to enable a user to more quickly identify the use and/or working positions of the first, second, and third portions. For example, the parts 12,16 can have a first color, while the second portion 14 can have another color indicating a use for a particular type of food product. By way of example only, the first and second handle parts 12,16 can be yellow, indicating to a user that a lemon can be placed in the receiving member 50 of the second handle part 16, whereas the press part 14 can be green, indicating to the user that a lime can be used with the press piece of the press part 14. Any other colors and combinations of colors may be utilized for pressing other types of food products. In some embodiments, the press piece 34 and receiving member 50 of the food product press 10 have different shapes and/or sizes, thereby being adapted for pressing different types and/or sizes of food product. For example, the smaller press piece 34 may be better adapted to press limes than lemons. Similarly, the receiving member 50 may be better adapted to press lemons than limes. Accordingly, the parts 12,14,16 of the food product press 10 can be adapted to press different shapes and/or sizes of food product between the first handle part 12 and the press part 14 and between the press part 14 and the second handle 16, thereby significantly increasing the effectiveness of the food product press 10 for a given type of food product.

The first and second handle parts may have a spring disposed therebetween biased to urge the first and second handle parts 12,16 away from each other such that manual pressure must be applied to overcome the spring bias to move the first and second handle parts toward each other about the pivot connection. For instance, a torsion spring may be disposed around a pivot connection of the first and second handle parts, and arms of the torsion spring may press against the handles 20,46 of the first and second handle parts or against the hinge portions 26,52 of the first and second handle parts.

In order to order to operate the food product press 10, a piece of food product is placed between the press piece 34 of the press part 14 or in the receiving member 50 of the second handle part 16. In some embodiments, the food product can be oriented in a particular manner within the press piece 34 or receiving member 50 for improved pressing results (e.g., cutting face down, in the case of pressing many types of fruits or vegetables). With the press part 14 in the lowered position, the food product can then be squeezed when the handles 20,46 are swung and forced toward one another, creating pressure on the food product within the press piece 34 or receiving member 50. The pressure can be used to force fluid from the food product (which can drain from the food product press 10 via the apertures 38,56) and/or to change the shape or state of the food product.

Figure 18:
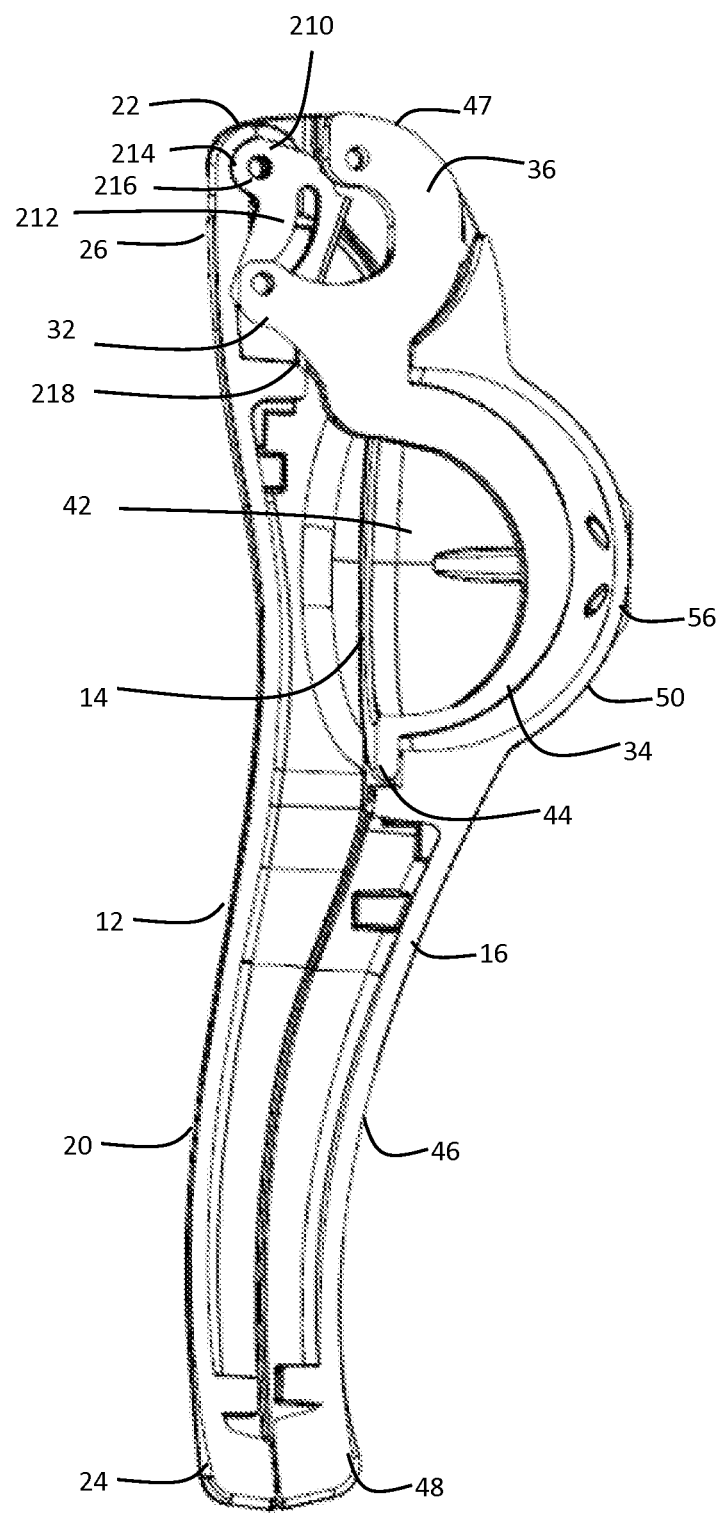
FIG. 18 is a cross-sectional view of the press of FIG. 14 along lines 18-18 of FIG. 16.
Figure 19:
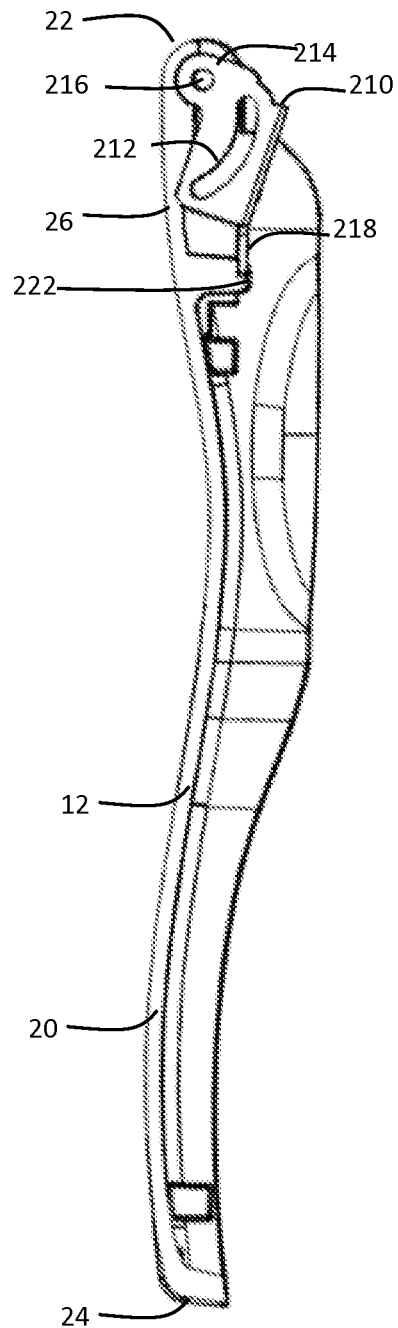
FIG. 19 is the cross-sectional view of the press of FIG. 18 with the press piece removed.
Figure 20:
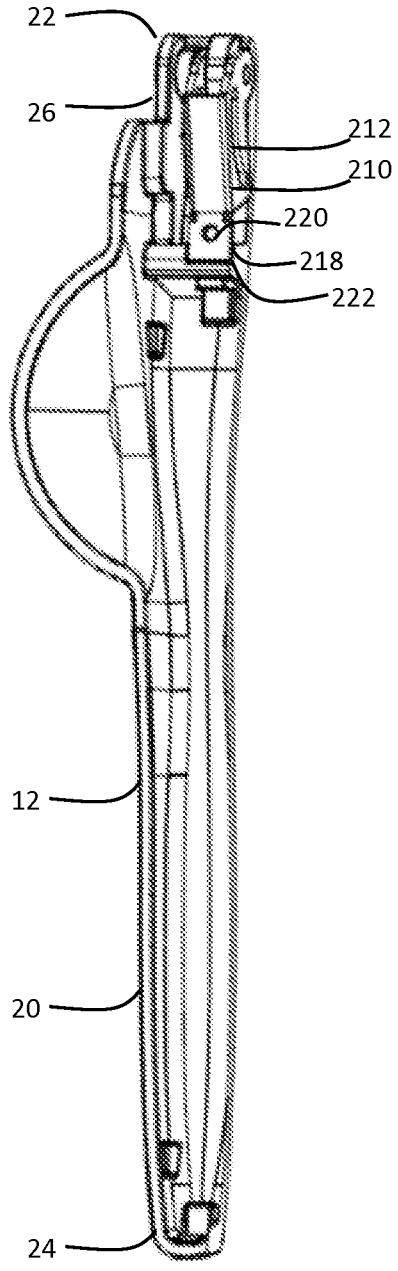
FIG. 20 is the perspective view of the cross-section of FIG. 19.

FIGS. 14-20 show an alternate embodiment of the press 200 of FIG. 1. Many features of the press 200 of FIGS. 14-20 are similar those described previously and will not be described again for the sake of brevity. Those elements have been indicated with like reference characters in FIGS. 14-20. In the embodiment shown in FIG. 14-20, the press 200 has a web member 210 with an arcuate slot 212 that provides the sliding connection between the first handle part 12 and the press part 14. The arcuate slot 212 of the web member 210 may provide additional mechanical advantage. Additionally, as shown in the drawings with particularity in FIGS. 14 and 15, the web member 210 may a separate part or detachable from the first handle part 12. To attach the web member 210 with the first handle part 12, the web member has a lobe 214 with a hole 216 that cooperates with the pivot connection of the first and second handle parts 12,16. Opposite the lobe 214, the web member 210 may be provided with a tab 218 having a hole 220. The tab 218 and the hole 220 may be brought into register with a corresponding mount 222 of the first handle part 12. Forming the web member 210 as a separate part for assembly may facilitate manufacturing of the press 200 and allow the user to disassemble the press for cleaning. In the alternative, the web member 210 may be monolithically formed in the first handle part. FIGS. 18-20 show further detail of the web member 210. The web member lobe hole 216 cooperates with the first handle part pivot point 62 to attach one end of the web member 210 integrally with the first handle part 12. The web member tab hole 222 attaches the opposite end to the mount 222 of the first handle part 12.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A food product press comprising:
    a first handle having first and second ends;
    a second handle having first and second ends, wherein the first and second handles are operatively hingedly connected to one another at their first ends;
    an intermediate member being operatively hingedly connected to the first end of the second handle and operatively slidingly connected to the first end of the first handle, wherein the intermediate member substantially fills the space between the first and second handles when the first and second handles are brought together;
    wherein the second handle comprises a hollow cavity; and
    wherein surfaces of at least one of the intermediate member and the hollow cavity comprises a plurality of ribs thereon.

2. The food press of claim 1, wherein the intermediate member has a press portion that fits within the hollow cavity of the second handle.

3. The food press of claim 1, wherein the hollow cavity has substantially the same shape as the press portion of the intermediate member.

4. The food press of claim 1, wherein the hollow cavity has a plurality of openings.

5. The food press of claim 4, wherein the intermediate member has protrusions that correspond to the openings of the hollow cavity.

6. A food press comprising:
   first and second handles hingedly connected to one another, the second handle having a recess:
   an intermediate member disposed between the first and second handles, the intermediate portion being operatively pivotally connected with the second handle and operatively slidingly connected with the first handle;
   wherein surface contours of the handle recess and the intermediate member have complementary shapes;
   wherein the handle recess and the intermediate member upon being brought together define a space therebetween sized to receive a food item; and
   wherein the intermediate member is disposed adjacent to and nests within the handle recess to permit squeezing of a food item therebetween.

7. The food press of claim 6, wherein the handle recess and the intermediate member are each substantially hemispherical in shape.

8. The food press of claim 6, wherein surfaces of at least one of the intermediate member and the hollow cavity comprises a plurality of ribs thereon.

9. The food press of claim 6, wherein the handle recess has a plurality of openings.

10. The food press of claim 6, wherein the intermediate member has protrusions with spacing therebetween allowing the protrusions to pass through the openings of the hollow cavity.

11. The food press of claim 6, wherein a pivot connection of the first and second handles is offset from a pivot connection of the second handle and intermediate member.

12. The food press of claim 6, wherein one of the first handle and the intermediate member has a web member with a slot, and the other of the first handle and the intermediate member has a pin configured to translate within the slot.

13. A food press comprising:
   first and second handles being operatively hingedly connected to one another, the second handle having a protrusion extending outward from the handle; and
   an intermediate member disposed between the first and second handles, the intermediate portion being operatively pivotally connected with the second handle and operatively slidingly connected with the first handle;
   wherein the second handle protrusion has an opening facing the intermediate member, the second handle protrusion opening opens to a hollow interior of the protrusion; and
   wherein the intermediate member upon being brought together with the second handle through the opening defines a space in hollow interior of the protrusion to receive a food item.

14. The food press of claim 13, wherein the handle protrusion has a second opening into the hollow interior.

15. The food press of claim 14, further comprising blades extending across the second opening.

16. The food press of claim 13, wherein the intermediate member has protrusions having spacing allowing the protrusions to pass through the blades of the second opening.

17. The food press of claim 14, further comprising a third opening oriented transverse to the first opening.

18. The food press of claim 1 wherein the intermediate member is operatively slidingly connected to the first end of the first handle as the first and the second handles are moved apart and brought together.

19. The food press of claim 6 wherein the intermediate member is operatively slidingly connected to the first handle as the first and the second handles are moved apart and brought together.

* * * * *